United States Patent
Eilebrecht et al.

(10) Patent No.: US 8,903,747 B2
(45) Date of Patent: Dec. 2, 2014

(54) ISOLATING CHANGES IN DYNAMIC SYSTEMS

(75) Inventors: Eric L. Eilebrecht, Woodinville, WA (US); Vance P. Morrison, Kirkland, WA (US); Erika Fuentes, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 893 days.

(21) Appl. No.: 12/486,756

(22) Filed: Jun. 18, 2009

(65) Prior Publication Data

US 2010/0325070 A1    Dec. 23, 2010

(51) Int. Cl.
| | |
|---|---|
| G06F 15/18 | (2006.01) |
| G01R 25/00 | (2006.01) |
| H03D 99/00 | (2006.01) |
| G06F 9/50 | (2006.01) |
| G06F 11/30 | (2006.01) |

(52) U.S. Cl.
CPC .............. *G06F 9/50* (2013.01); *G06F 11/3093* (2013.01)
USPC ........... 706/12; 706/22; 327/2; 327/8; 327/50

(58) Field of Classification Search
USPC ......................................................... 706/12
See application file for complete search history.

(56) References Cited

U.S. PATENT DOCUMENTS

| | | | |
|---|---|---|---|
| 6,549,858 B1 * | 4/2003 | Shelley et al. .................. | 702/56 |
| 6,789,049 B2 | 9/2004 | Gross et al. | |
| 7,039,475 B2 | 5/2006 | Sayyarrodsari et al. | |
| 7,222,027 B2 | 5/2007 | Gorinevsky et al. | |

OTHER PUBLICATIONS

MathWorks, Signal Processing Toolbox Version 4.2, 1999 [retrieved on Mar. 13, 2013]. Retrieved from the Internet<URL: http://www.ling.upenn.edu/courses/ling525/signal_tb.pdf>.*
Weizmann, goertzel, 2007 [retrieved on Mar. 13, 2013]. Retrieved from the Internet<URL: http://www.weizmann.ac.il/matlab/toolbox/signal/goertzel.html>.*
Cain, et al., "Approximation of FIR by IIR Digital Filters: An Algorithm Based on Balanced Model Reduction", Retrieved at <<http://ieeexplore.ieee.org/stamp/stamp.jsp?arnumber=00120796>>, IEEE Transactions on Signal Processing, vol. 40. No. 3, Mar. 1992, pp. 532-542.
Lin, et al., "A Goal Tree Based High-Level Test Planning System for DSP Real Number Models", Retrieved at <<http://citeseerx.ist.psu.edu/viewdoc/download?doi=10.1.1.107.1261&rep=rep1&type=pdf>>, 1998 IEEE, pp. 10.

(Continued)

*Primary Examiner* — Jeffrey A Gaffin
*Assistant Examiner* — Nathan Brown, Jr.
(74) *Attorney, Agent, or Firm* — Kevin Sullivan; Kate Drakos; Micky Minhas

(57) ABSTRACT

A software optimization system isolates an effect of a change in a control variable from effects of ongoing, unknown changes in other variables. The system discards effects due to noise so that effects of interest to a programmer are more easily visible. The software optimization system treats variations in one or more control variables and in the output of the system as signals. The system varies the control variable at a specific frequency unlikely to correlate with uncontrolled variations in external variables. The system uses digital signal processing (DSP) techniques to filter the output, isolating the frequency of the control variable variation. The system then compares the resulting filtered output to the input to determine the approximate effect of the variation in the control variable.

6 Claims, 10 Drawing Sheets

(56) References Cited

OTHER PUBLICATIONS

Bounceur, et al., "Pseudorandom Functional BIST for Linear and Nonlinear MEMS", Retrieved at <<http://www.date-conference.com/archive/conference/proceedings/PAPERS/2006/DATE06/PDFFILES/06C_4.pdf>>, 2006 EDAA, pp. 6.

Hakansson, L., "The Filtered-x LMS Algorithm", Sweden, 1998, 6 pages.

* cited by examiner

ISOLATING CHANGES IN DYNAMIC SYSTEMS

BACKGROUND

In computing, optimization is the process of modifying a system to make some aspect of it work more efficiently or use fewer resources. For instance, a programmer may optimize a computer program so that the program executes more rapidly, is capable of operating with less memory or other resources, or draws less power. The system may be a single computer program, a collection of computers, or even an entire network such as the Internet. Although the word "optimization" shares the same root as "optimal," it is rare for the process of optimization to produce a truly optimal system. The optimized system will typically only be optimal in one application or for one audience. One might reduce the amount of time that a program takes to perform some task at the price of making it consume more memory. In an application where memory space is at a premium, one might deliberately choose a slower algorithm in order to use less memory. Often there is no "one size fits all" design which works well in all cases, so engineers make trade-offs to optimize the attributes of greatest interest. Thus, a programmer may halt the process of optimization before a completely optimal solution has been reached.

Optimization can be automated or performed by programmers. Programmers usually undertake optimizing a whole system because it is too complex for automated optimizers. In this situation, programmers or system administrators explicitly change code so that the overall system performs better. Although manual optimization can produce better efficiency, it is far more expensive than automated optimizations. Programmers sometimes believe they have a clear idea of where the bottleneck is, but intuition is frequently wrong. Optimizing an unimportant piece of code will typically do little to help the overall performance. Programmers use applications called profilers (or performance analyzers) to find the sections of the program that are taking the most resources—the bottleneck. When the bottleneck is localized, optimization usually starts with a rethinking of the algorithm used in the program: more often than not, a particular algorithm can be specifically tailored to a particular problem, yielding better performance than a generic algorithm. In many cases, it is difficult or impossible for a human to optimize a particular system, because he/she may not know what resources will be available in the environment in which the program will actually run. For example, an Internet application developer does not know how much bandwidth will be available to each machine running the application, and in fact the availability of that particular resource is constantly changing. As another example, take an application with parts that can run in parallel, where the programmer wants to decide how many parts to run in parallel. He cannot optimize this statically, because he does not know at design time what machines the application will run on.

Algorithms that optimize the outputs of dynamic systems typically measure the effect of changes in the inputs that are under the algorithm's control ("control variables") on the output. The system may have many other inputs which are outside of the algorithm's control, but that have as much or more effect on the output of the system than the control variables. The value of each of these external inputs may not be known, and even if they were known, a programmer may not know how they would be reflected in the output the programmer is trying to optimize. Furthermore, the ability of the algorithm to obtain precise measurements of the system's output is often limited. This results in a "noisy" view of the output data, making it even more difficult to measure the effect of an input change.

For example, in a dynamic thread pool, a control variable might be the number of threads in the pool ("thread count"), and the output to optimize might be the rate at which work completes on those threads ("throughput"). A change in the number of threads will have an effect on the throughput, but so will a change in the workload being executed in the pool, a change in resource demands of other processes running on the machine, and so forth. Because these external variables are outside of our control, we cannot hold them constant while we measure the effect of a throughput change.

Another example would be optimizing throughput on a network by finding an optimal packet size. One would like to know how a change in packet size affects the network's throughput, but would have to isolate this from other changes due to external factors such as changes in user access patterns, variations in incoming external traffic, failure of load-balanced redundant systems, and so on. Noise may be introduced into any throughput measurement for similar reasons to the thread pool example.

SUMMARY

A software optimization system is described herein that isolates an effect of a change in a control variable from effects of ongoing, unknown changes in other variables. The system discards effects due to noise so that effects of interest to a programmer are more easily visible. The software optimization system treats variations in one or more control variables and in the output of the system as signals. The system varies the control variable at a specific frequency unlikely to correlate with uncontrolled variations in external variables. The system uses digital signal processing (DSP) techniques to filter the output, isolating the frequency (or frequencies) of the control variable variation. The system then compares the resulting filtered output to the input to determine the approximate effect of the variation in the control variable. The system is useful for a wide variety of optimization problems that are becoming more and more common as engineers build more software that is self-optimizing without requiring user intervention. Thus, the software optimization system provides a programmer with information for optimizing software that clarifies the effects of particular changes to input variables based on their effects on output of a dynamic system by excluding effects due to noise.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
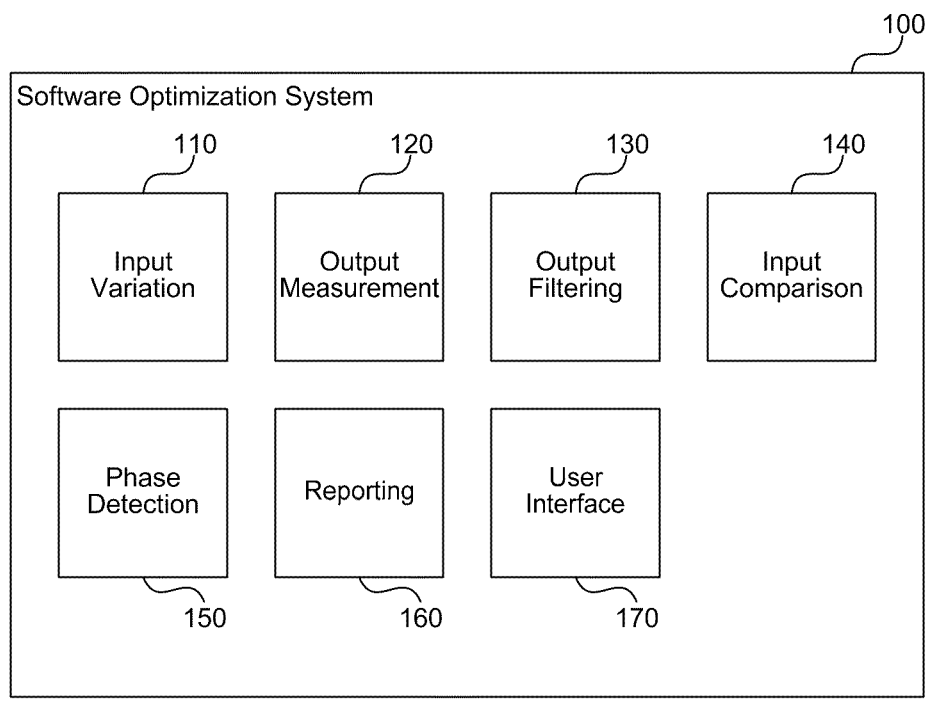
FIG. 1 is a block diagram that illustrates components of the software optimization system, in one embodiment.

A software optimization system is described herein that isolates an effect of a change in a control variable from effects of ongoing, unknown changes in other variables. The system discards effects due to noise so that effects of interest to a programmer are more easily visible. The software optimization system treats variations in one or more control variables and in the output of the system as signals. The system varies the control variable at a specific frequency (or random known frequencies) unlikely to correlate with uncontrolled variations in external variables. For example, the system may vary a thread count of a thread pool once per minute and measure the throughput of the work completed by the thread pool. The system uses digital signal processing (DSP) techniques to filter the output, isolating the frequency (or frequencies) of the control variable variation. For example, the system can apply a frequency filter based on the known frequency at which the thread pool thread count is being varied so that output effects related to the thread pool count are more readily visible. The system then compares the resulting filtered output to the input to determine the approximate effect of the variation in the control variable.

Although such techniques are common in hardware signal processing, these techniques have not been applied to software, and in particular to the problem of measuring the effect of variations in one variable of a multi-variable dynamic system to filter out noise and external influences. As mentioned earlier, this is useful in a wide variety of optimization problems, which are becoming more and more common as engineers build more software that is self-optimizing without requiring user intervention. Thus, the software optimization system provides a programmer with information for optimizing software that clarifies the effects of particular changes to input variables based on their effects on output of a dynamic system by excluding effects due to noise from unrelated variations in the system.

As an example, suppose that a programmer wants to measure the effect on a system's output of changing a control variable from N to N+1. Rather than simply increasing the value of the variable, and measuring the output before and after (which would not isolate the effect of the change from the effects of other changes), the software optimization system may vary the input in a wave pattern, moving back and forth between N and N+1 over time. This creates a square wave in the input. The system may also vary the input in other ways, such as sine waves, triangle waves, or even random motion, so long as the system can construct a digital filter capable of isolating the input pattern in the output. At the same time, the system collects samples of the output. For example, in the case of the thread pool mentioned previously, the system may periodically measure the rate at which work has been completing. The system filters these output samples to find the component of the output signal that corresponds to the input signal. The system can then compare the magnitude of the output signal to that of the input to determine the extent to which the input changes affected the output.

For many problems, it is also helpful to measure the phase of the filtered output signal to compare the phase to that of the input signal. For example, in a thread pool it is sometimes the case that increasing the thread count will increase throughput up to a point beyond which increases in thread count will actually decrease the throughput. If the system looks only at the magnitude of the filtered throughput signal, the system will observe that the magnitude diminishes as thread count increases, until the magnitude reaches a point where it starts increasing again. The phase of the throughput signal may tell a programmer whether the throughput is increasing or decreasing. If variations in throughput are in phase with the variations in thread count, then increasing thread count is increasing throughput. If the signals are out of phase, then increasing thread count is having the opposite effect.

FIG. 1 is a block diagram that illustrates components of the software optimization system, in one embodiment. The system 100 includes an input variation component 110, an output measurement component 120, an output filtering component 130, an input comparison component 140, a phase detection component 150, a reporting component 160, and a user interface component 170. Each of these components is described in further detail herein.

The input variation component 110 varies a value of an input variable of a dynamic software system to produce an input signal at a known frequency that can be detected in an output signal derived from measurements of an output value over time. For example, the input variation component may receive a variable from a programmer to attempt to automatically optimize by varying the variable's value over a specified range. The input variation component 110 sets the value of the input variable to various values within the range in a known pattern over time. The known pattern may be that of a square wave, sine wave, or even a random pattern so long as the pattern is saved for use in extracting the results of the input signal on the output signal.

The output measurement component 120 performs periodic measurement of the output value to determine the output signal. The output measurement component 120 may use performance counters, application programming interfaces (APIs), and other information sources to gather the output of a particular dynamic system. The measured output will contain both the effects of the varied input, as well as external factors (i.e., noise) not related to the input change.

The output filtering component 130 filters the output signal using digital signal processing to isolate the input signal and remove unwanted noise. For example, the output filtering component 130 may use the Goertzel or other algorithms to remove unwanted noise. The Goertzel algorithm is a DSP technique for identifying frequency components of a signal, published by Dr. Gerald Goertzel in 1958. While the general Fast Fourier transform (FFT) algorithm computes evenly across the bandwidth of the incoming signal, the Goertzel algorithm looks at specific, predetermined frequency. This can be useful for the software optimization system, which inputs a known input signal frequency. The system can also use implementations of the FFT algorithm, matched filters, band pass filters, and other types of filtering to isolate any effects of the input signal.

The input comparison component 140 compares the filtered output signal to the input signal to determine an approximate effect of the variation in the input variable on the output. For example, doubling the input value may quadruple the output value or other similar amplifications or suppressions of magnitude. There may also be a point at which an effect reverses, so that an increased input signal that once increased the magnitude of the output signal begins to decrease the magnitude of the output signal. Because of the ability of the system to highlight movement of the output signal due to changes in the input signal and remove unwanted noise from the output, the system makes it easier for a programmer to detect such turning points and other effects. Accordingly, the programmer can more effectively use such information to appropriately set the value of the input variable in a production system.

The phase detection component 150 detects shifts in phase between a change in the input signal and the resulting output signal. Some systems may display effects where an input signal has a delayed impact on the output signal. This manifests during analysis as a shift in the phase of the output signal when compared with the input signal. By using DSP techniques, the phase detection component 150 can determine the magnitude of any phase shift when comparing the input signal to the filtered output signal. A programmer may use the phase shift information to make decisions about an appropriate value for the input variable to produce a desired effect at the output.

The reporting component 160 displays reports to a user depicting the outcome of various phases of the analysis of the system. For example, the reporting component 160 may display the input signal, output signal, and filtered output signal as graphs that the user can view to interpret the effect of input signal variation on the output. The reporting component 160 may include options for configuring the type of information displayed as well as options for exporting report data to a file or other portable storage medium for further analysis.

The user interface component 170 interacts with the user to display reports and to receive configuration information from the user. The component 170 may receive information such as a selection of an input variable to vary, a range of values over which to vary the input signal, a type of variation (e.g., square wave, sine wave, and so forth), and other settings that affect the operation of the system 100. The user interface component 170 may also display information to the user about the status of the analysis, the present state of the system 100, and so forth.

The computing device on which the software optimization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
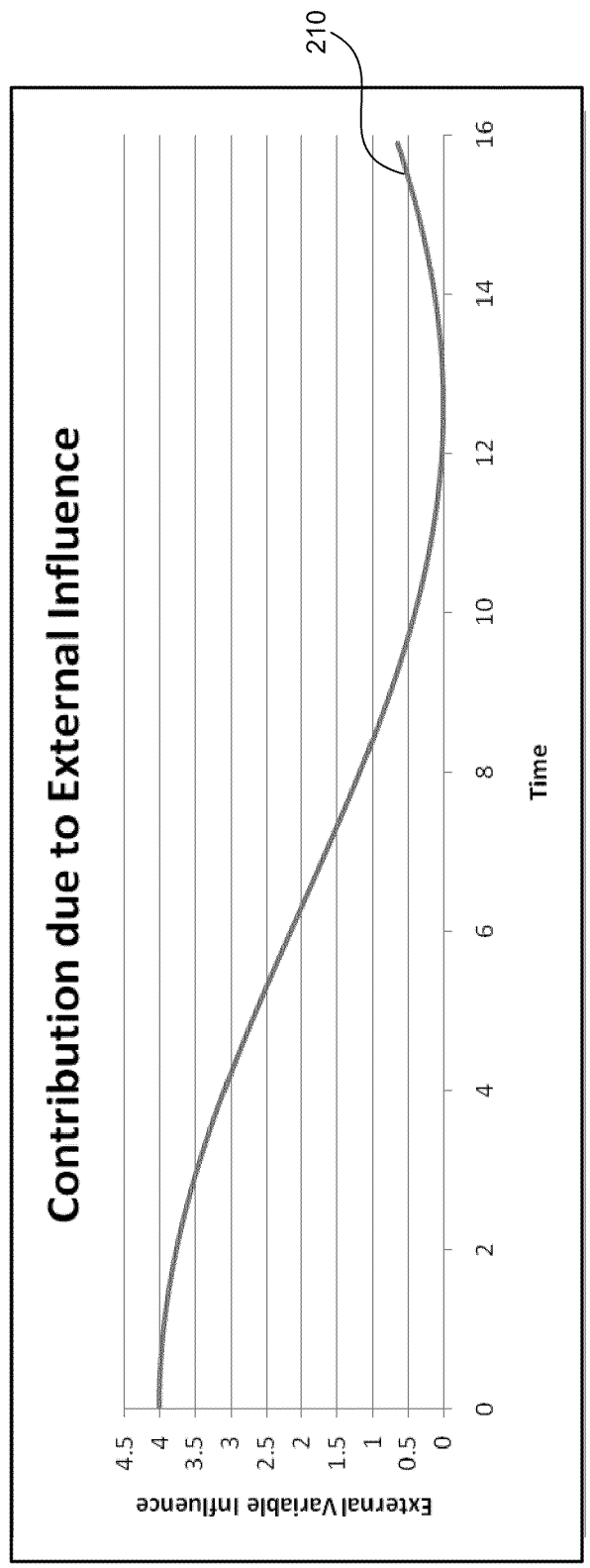
FIG. 2 is a signal diagram that illustrates an example of a variation of a single external influence that affects a system.
Figure 3:
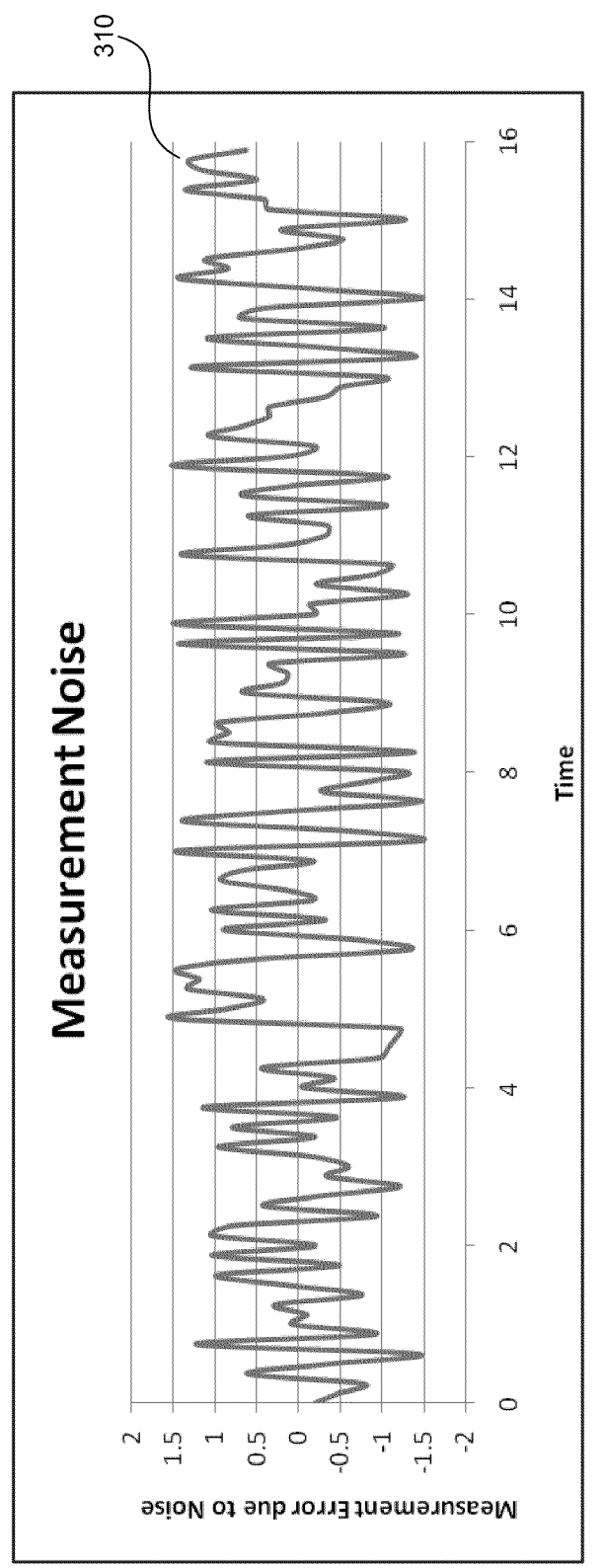
FIG. 3 is a signal diagram that illustrates noise due to measurement over time.
Figure 4:
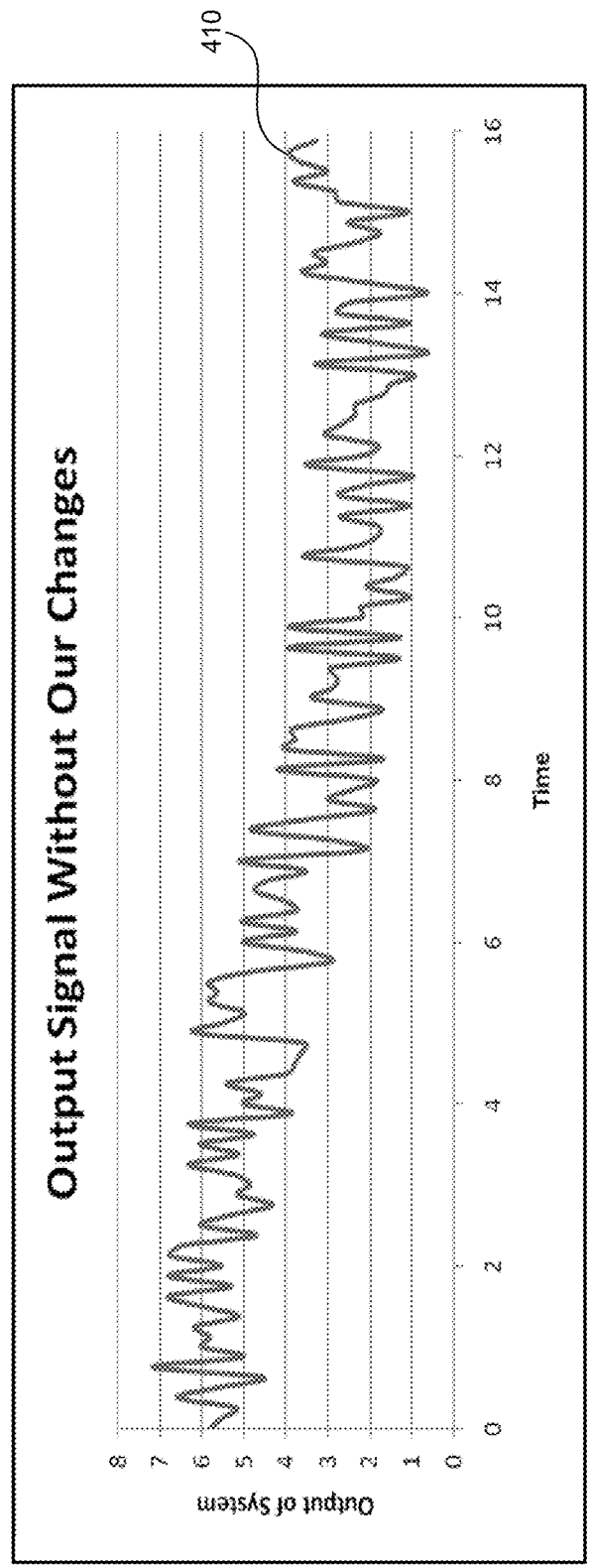
FIG. 4 is a signal diagram that illustrates an output signal of the example system over time.

FIGS. 2 through 8 are signal diagrams that illustrate various signals produced or measured by the software optimization system, in one embodiment. FIG. 2 is a signal diagram that illustrates an example of a variation of a single external influence that affects a system. The example system has one control, or input, variable, and the illustrated external influence 210 that varies sinusoidally. FIG. 3 is a signal diagram that illustrates noise due to measurement over time. Measurement is imperfect and will display effects from various influences. Thus, the signal 310 varies erratically. FIG. 4 is a signal diagram that illustrates an output signal of the example system over time. The output signal 410 illustrates the difficulty of gathering information from such systems. The output signal 410 does not appear to the casual observer to exhibit any pattern or reason.

Figure 5:
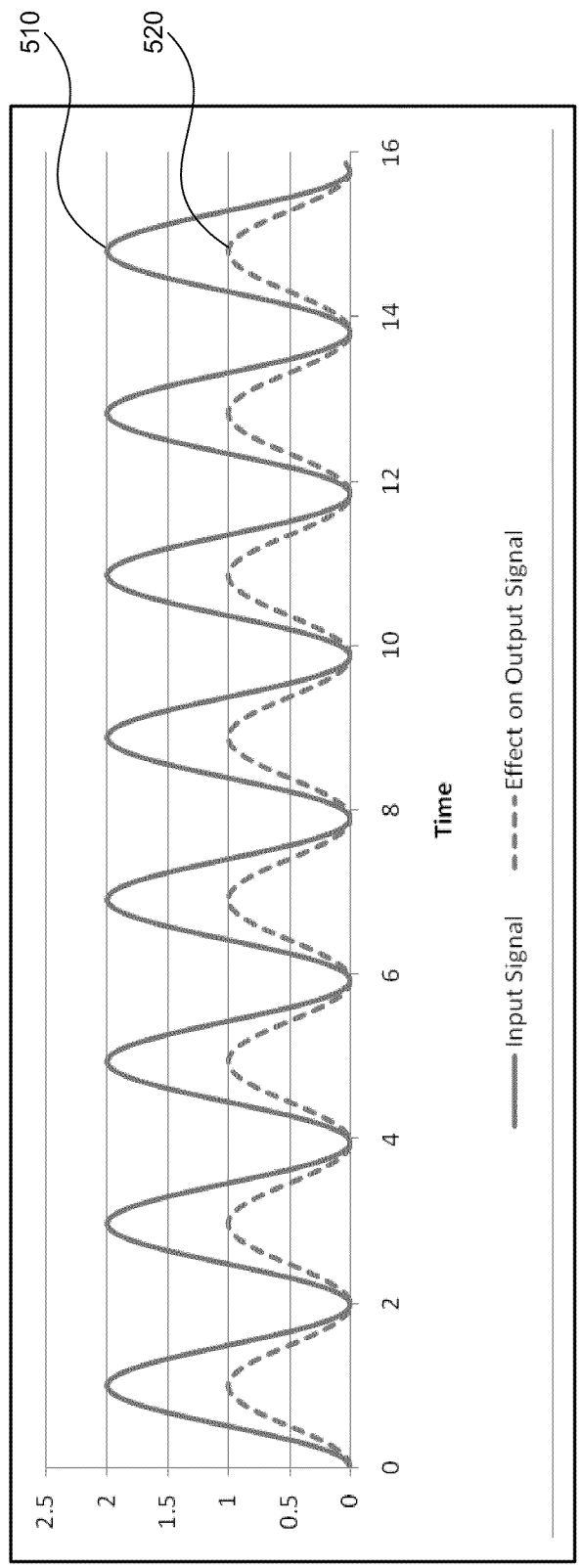
FIG. 5 is a signal diagram that illustrates an input signal and the expected effect on the output signal.
Figure 6:
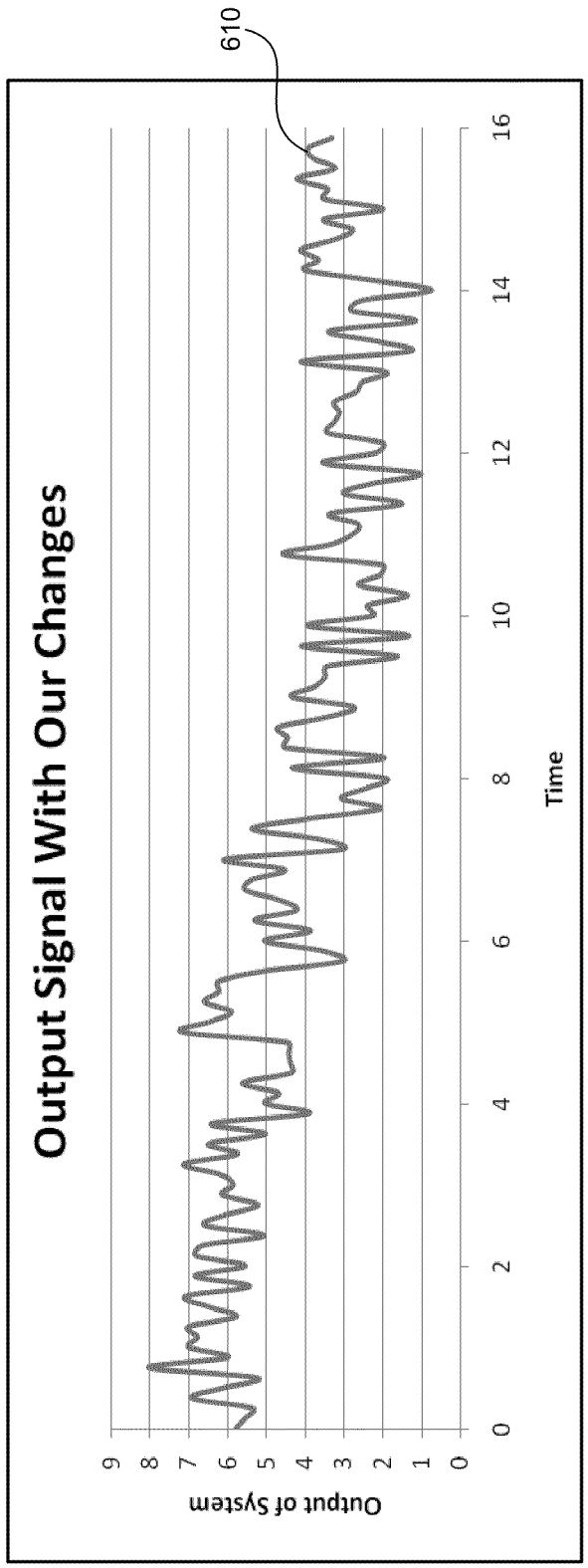
FIG. 6 is a signal diagram that illustrates a measurement of the output signal when the input signal of FIG. 5 is applied.
Figure 7:
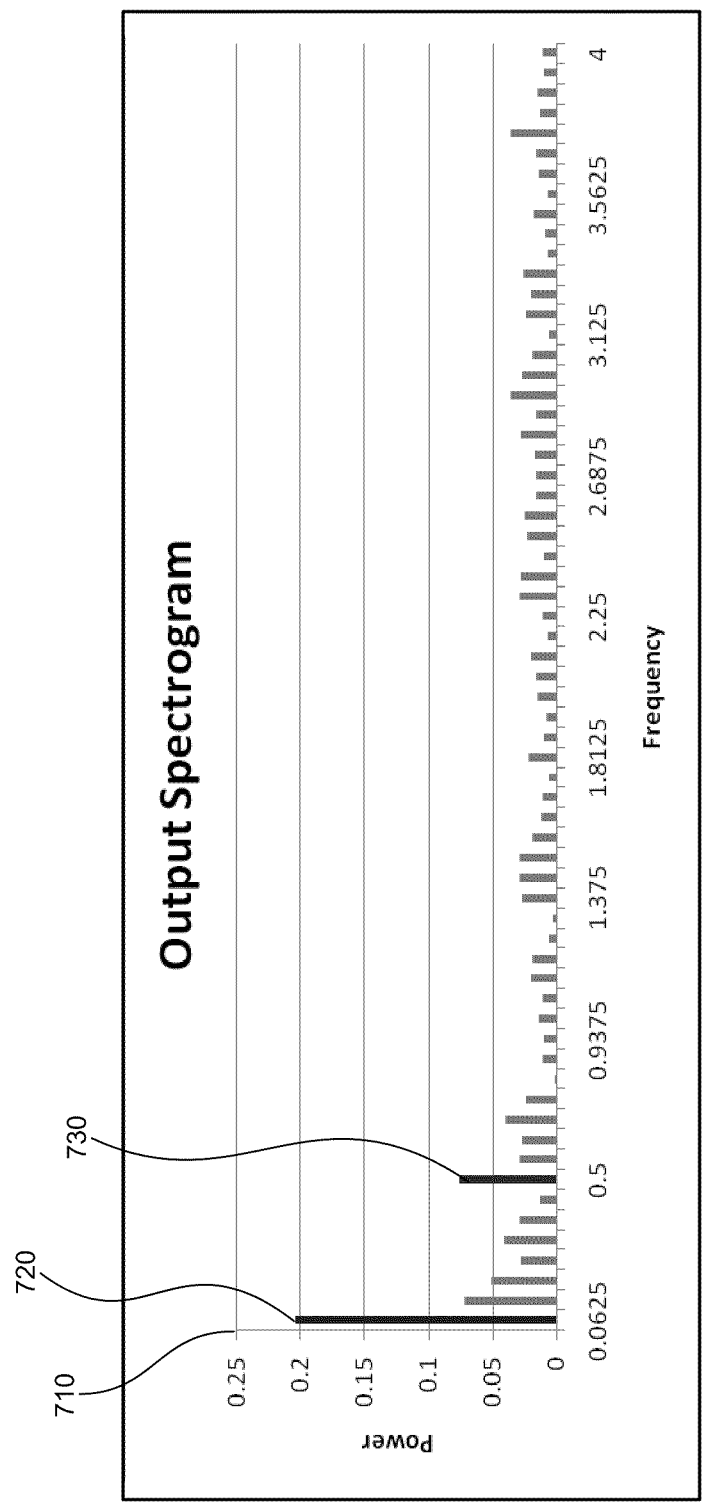
FIG. 7 is a spectrogram of the output signal.

FIG. 5 is a signal diagram that illustrates an input signal and the expected effect on the output signal. The input signal 510 is a sine wave that varies gradually between the values 0 and 2 over time. The expected effect on the output signal 520 is for the output signal 520 to show a change of half the magnitude of the input signal 510. FIG. 6 is a signal diagram that illustrates a measurement of the output signal when the input signal of FIG. 5 is applied. The output signal 610 varies erratically and does not appear to follow any pattern related to the input signal. Note that the output signal 610 is nearly indistinguishable, to the naked eye, from the output that would be observed without any changes in the control variable. The control variable changes are only a small factor in the overall output of the system. However, the changes did have an effect, which can be observed directly by looking at a spectrogram of the frequency components of the output signal. FIG. 7 is a spectrogram of the output signal. The spectrogram 710 contains two distinct "peaks" in the chart. The first peak 720 at the lowest frequency represents the slow change due to the "external influence," while the second peak 730 at a frequency of 0.5 (which was the frequency at which the input is varying) represents the effect of changing the control variable.

Figure 8:
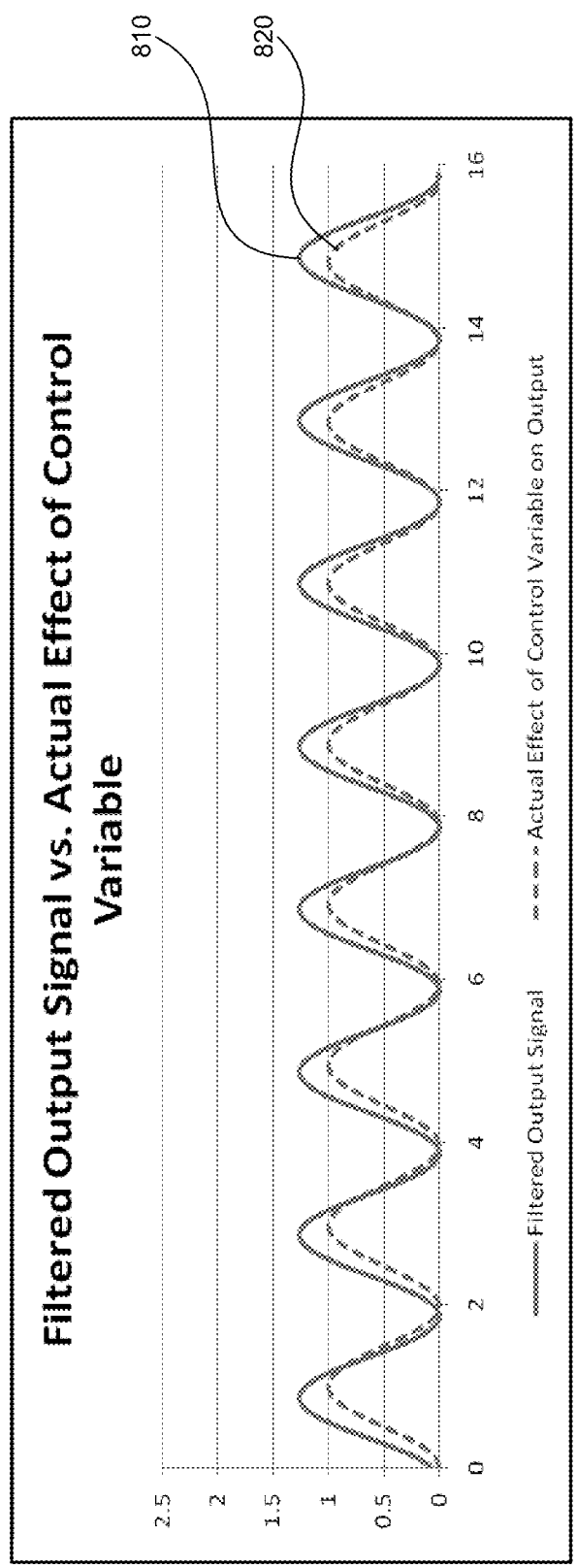
FIG. 8 is a signal diagram that illustrates the output signal after applying a digital filter that isolates the particular frequency component of the input signal.

FIG. 8 is a signal diagram that illustrates the output signal after applying a digital filter that isolates the particular frequency component of the input signal. The diagram includes the filtered output signal 810 as well as the expected effect 820 of the control variable on the output signal. Note that the filtered output is a very good approximation of the actual effect of the input changes. The filtered output signal 810 has approximately half the amplitude of the input wave, telling the observer that the output changed half as much as the input. The output signal 810 is also in phase with the input signal, which tells the observer that an increase in the input results in an increase in the output (and vice-versa). Had the two waves been out of phase, it would have told the opposite. The information thus obtained can be use to make decisions about the next change in the input.

There can be many reasons for periodically varying external influences. For example, a web server may have a slow ramp up time that shows up in a measurement of traffic as a slowly increasing workload. As another example, a thread pool may have work items such that every fourth work item is larger than the others are and thus takes longer to complete, so that a measurement of thread pool throughput shows a sinusoid or other pattern. The software optimization system attempts to vary the input signal at a frequency or pattern that is unlikely to naturally occur. In this way, the system can isolate effects due to external influences from effects due to changes in the input signal to get a measure of the true effect of input changes on the output of a dynamic system.

Figure 9:
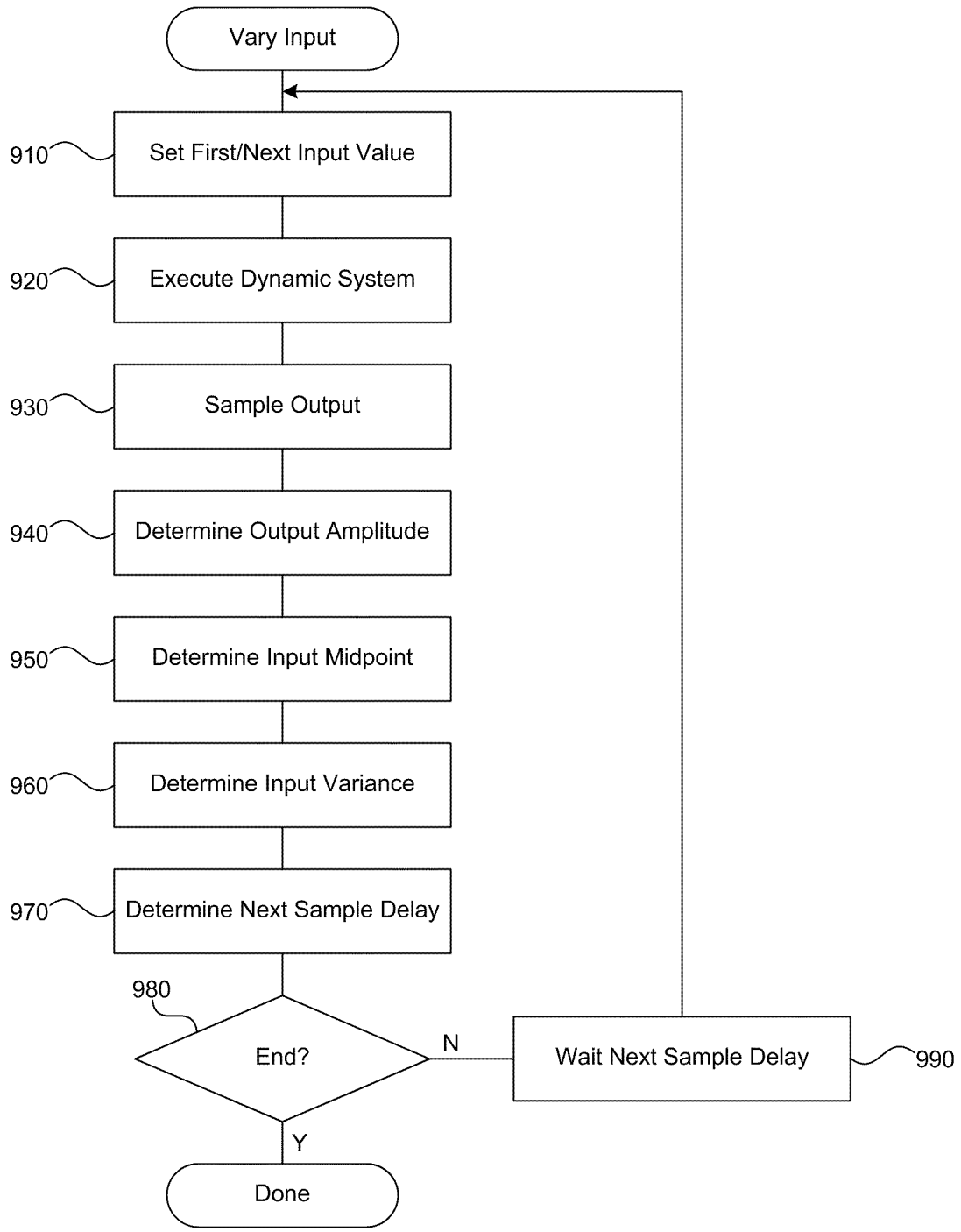
FIG. 9 is a flow diagram that illustrates processing of the input variation component to select input values for a dynamic system, in one embodiment.

FIG. 9 is a flow diagram that illustrates processing of the input variation component to select input values for a dynamic system, in one embodiment. Rather than a periodic pattern for the input value, the software optimization system may dynamically set the input value based on a feedback loop using the measured output. Beginning in block 910, the component sets the initial input value. For example, a user may provide the initial value or the component may guess or choose a random value for the initial value. The user may also provide a range of values within which the component can select. Continuing in block 920, the component allows the dynamic system to execute with the set input value. For example, the dynamic system may include a software function that the component calls to execute the dynamic system. The dynamic system may be a thread pool, game, or any other type of software system that receives input and produces a measurable output.

Continuing in block 930, the component samples the output of the dynamic system. Sampling the output determines a current amplitude of the output, and can be used with past sampled values of the output to create a signal that represents the value of the output over time. Continuing in block 940, the component applies one or more signal processing functions to filter the output and isolate the amplitude due to the input value. For example, the component may apply the Goertzel or FFT algorithm to isolate changes in the output amplitude due to the input value. Continuing in block 950, the component determines a next midpoint for the input value. For example, the system may execute an optimization function to determine a next control setting based on the past control setting, input amplitude, and measured output amplitude.

Continuing in block 960, the component determines the next variance for the input value. The input is a wave that includes a midpoint and an amplitude that specifies the variance from the midpoint. The component determines the variance or amplitude based on a past estimate of the measured noise and a desired signal to noise ratio. The component selects an input value that is large enough to overcome any noise in the output signal. Continuing in block 970, the component determines the time at which to repeat the process and modify the input signal again. For example, the component may determine that it takes a certain amount of time for the input changes to be seen at the output, and may wait that amount of time before modifying the input signal again. Continuing in decision block 980, if the component receives an indication to end the analysis, then the component completes, else the component continues at block 990. Continuing in block 990, the component waits the amount of time determined in block 970, then loops to block 910 to select the next input value. After block 990, these steps conclude.

Figure 10:
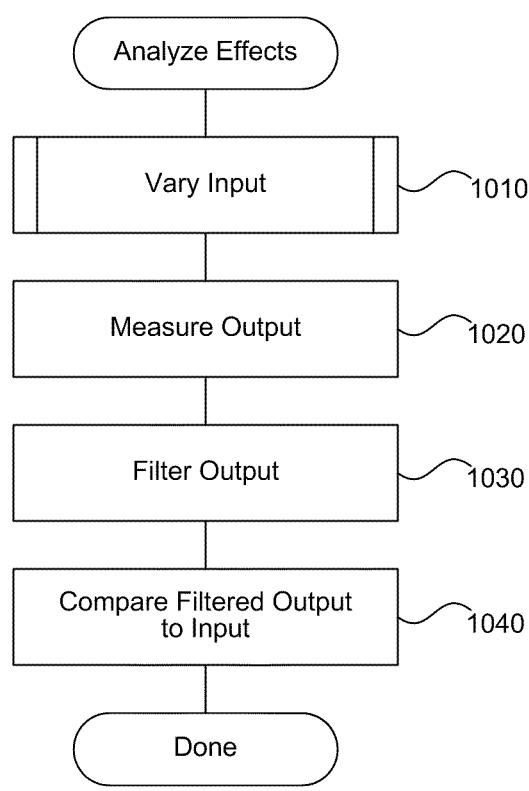
FIG. 10 is a flow diagram that illustrates the processing of the software optimization system to analyze effects of an input variable change on the output of a dynamic system, in one embodiment.

FIG. 10 is a flow diagram that illustrates the processing of the software optimization system to analyze effects of an input variable change on the output of a dynamic system, in one embodiment. Beginning in block 1010, the software optimization system varies an input signal applied to at least one input of a dynamic system according to a pattern over time. For example, the software optimization system may apply a changing input value as a sinusoidal or other wave pattern. The input may be a thread pool thread count, packet size in a network system, video quality of frames in a media playback application, visual quality settings in a game, or any other dynamic system that includes variable inputs and measurable outputs. Continuing in block 1020, the software optimization system measures an output signal produced by the applied input signal. For example, the software optimization system may sample performance counters or other measurable outputs of the dynamic system to determine an effect of the input signal on the dynamic system.

Continuing in block 1030, the software optimization system filters the output signal using a processing function that filters the output signal based on a frequency component of the input signal. For example, the software optimization system may apply an implementation of a Goertzel, FFT, or other algorithm that isolates frequency components of signals. The software optimization system selects an input signal frequency such that the filtered output will eliminate or reduce the input of extraneous effects on the analysis and clarify effects on the output related to the input signal. Continuing in block 1040, the software optimization system compares the filtered output to the input signal and records the effects of the input signal on the amplitude and phase of the output signal. For example, the system may display a report that overlays the filtered output signal on the input signal and indicates any amplitude and phase differences between the two signals. After block 1040, these steps conclude.

In some embodiments, the software optimization system provides a selectable input signal type. A programmer operating the system may be able to select from sinusoidal, square, triangle, and other wave patterns. In addition, the system may allow the programmer to select a random or feedback-based pattern selected by the system automatically. The use of different input signal patterns may allow the system to overcome various types of external noise and some pattern types may be more appropriate for certain types of input variables. For example, a Boolean or discrete value is difficult to vary sinusoidally, but lends itself nicely to a square wave pattern.

In some embodiments, the software optimization system selects input signal values based on a noise detection function. Detecting noise that affects a dynamic system allows the software optimization system to select values for the input signal that are of sufficient magnitude and appropriate character (e.g., frequency, amount, and so forth) to be distinguished from other components that affect the output signal. The system may determine, through spectrographic or other analysis, the frequency of noise or other external components before varying the input value to select a pattern for the input value that more effectively distinguishes it from any dominant existing noise.

In some embodiments, the software optimization system employs statistical analysis in place of or in addition to DSP techniques to analyze the effects of an input value on the output value. For example, the system may watch for stabilization of an output effect using statistical analysis. The system may also use curve fitting or other techniques to estimate the effect of an input value on the output.

From the foregoing, it will be appreciated that specific embodiments of the software optimization system have been described herein for purposes of illustration, but that various modifications may be made without deviating from the spirit and scope of the invention. For example, although specific algorithms have been used in examples, the system can use a variety of DSP processing functions and/or statistical techniques for calculating noise, isolating effects of an input signal, dynamically setting the input value, and so forth. Accordingly, the invention is not limited except as by the appended claims.

We claim:

1. A computer-readable storage memory comprising instructions for controlling a computer system to dynamically set an input value of a dynamic system, wherein the instructions, when executed, cause a processor to perform actions comprising:
    setting an initial input value of an input variable used to produce an input signal;
    allowing the dynamic system to execute with the set input value;
    sampling an output of the dynamic system to determine a current amplitude of the output and create an output signal that represents the value of the output over time;
    applying one or more signal processing functions to filter the output signal and isolate the amplitude due to the input value;
    detecting a shift in phase between a change in the input signal and a resulting output signal;
    determining a next midpoint for the input value based on the initial input value and the current amplitude of the output;
    determining a next variance for the input value based on an estimate of noise measured at the output and a target signal to noise ratio; and
    automatically determining a next input value based on the determined next midpoint and variance.

2. The memory of claim 1 further comprising determining a time at which to repeat the process and modify the input signal again.

3. A computer-implemented method for controlling a computer system to dynamically set an input value of a dynamic system, comprising:
    setting an initial input value of an input variable used to produce an input signal;
    allowing the dynamic system to execute with the set input value;
    sampling an output of the dynamic system to determine a current amplitude of the output and create an output signal that represents the value of the output over time;
    applying one or more signal processing functions to filter the output signal and isolate the amplitude due to the input value;
    detecting a shift in phase between a change in the input signal and a resulting output signal;
    determining a next midpoint for the input value based on the initial input value and the current amplitude of the output;
    determining a next variance for the input value based on an estimate of noise measured at the output and a target signal to noise ratio; and
    automatically determining a next input value based on the determined next midpoint and variance.

4. The computer-implemented method of claim 3 further comprising determining a time at which to repeat the process and modify the input signal again.

5. A computer system for controlling a computer system to dynamically set an input value of a dynamic system, comprising:
    a processor and memory configured to execute software instructions, wherein the instructions, when executed, cause the processor to perform actions comprising:
    setting an initial input value of an input variable used to produce an input signal;
    allowing the dynamic system to execute with the set input value;
    sampling an output of the dynamic system to determine a current amplitude of the output and create an output signal that represents the value of the output over time;
    applying one or more signal processing functions to filter the output signal and isolate the amplitude due to the input value;
    detecting a shift in phase between a change in the input signal and a resulting output signal;
    determining a next midpoint for the input value based on the initial input value and the current amplitude of the output;
    determining a next variance for the input value based on an estimate of noise measured at the output and a target signal to noise ratio; and
    automatically determining a next input value based on the determined next midpoint and variance.

6. The computer system of claim 5 further the instructions further comprising determining a time at which to repeat the process and modify the input signal again.

* * * * *